United States Patent [19]

Eastman

[11] Patent Number: 5,229,183

[45] Date of Patent: Jul. 20, 1993

[54] DRUM PROTECTOR

[76] Inventor: Gilbert R. Eastman, 2516 Summit Ridge Dr., South Bend, Ind. 46628

[21] Appl. No.: 829,502

[22] Filed: Feb. 3, 1992

[51] Int. Cl.$^5$ .................. B32B 3/06; B32B 31/18
[52] U.S. Cl. .................... 428/99; 428/138; 428/903.3; 156/92
[58] Field of Search ............ 428/99, 903.3, 138; 114/219; 156/92

[56] References Cited

U.S. PATENT DOCUMENTS 4,057,141 11/1977 Laurie et al. .................. 428/903.3

Primary Examiner—Alexander S. Thomas
Attorney, Agent, or Firm—Leo H. McCormick, Jr.

[57] ABSTRACT

A method of manufacturing a protective member for a drum from a supply of used tires. A first used tire is obtained from a source and the sidewalls are removed to define a first cylindrical tread section. The first cylindrical tread section is severed to form a first strip. A second tire is obtained from the source and the sidewall removed to define a second cylindrical tread section. The second cylindrical tread section is severed to form a second strip. The first and second strips are thereafter joined together to form a unitary structure. A plurality of substantially rectangular members are cut from the sidewalls of either the first or second used tire. The plurality of rectangular members are attached to the unitary structure to form cleats. The cleats are fixed to a floor to position said unitary structure around the drum and hold the drum in a stationary position.

18 Claims, 2 Drawing Sheets

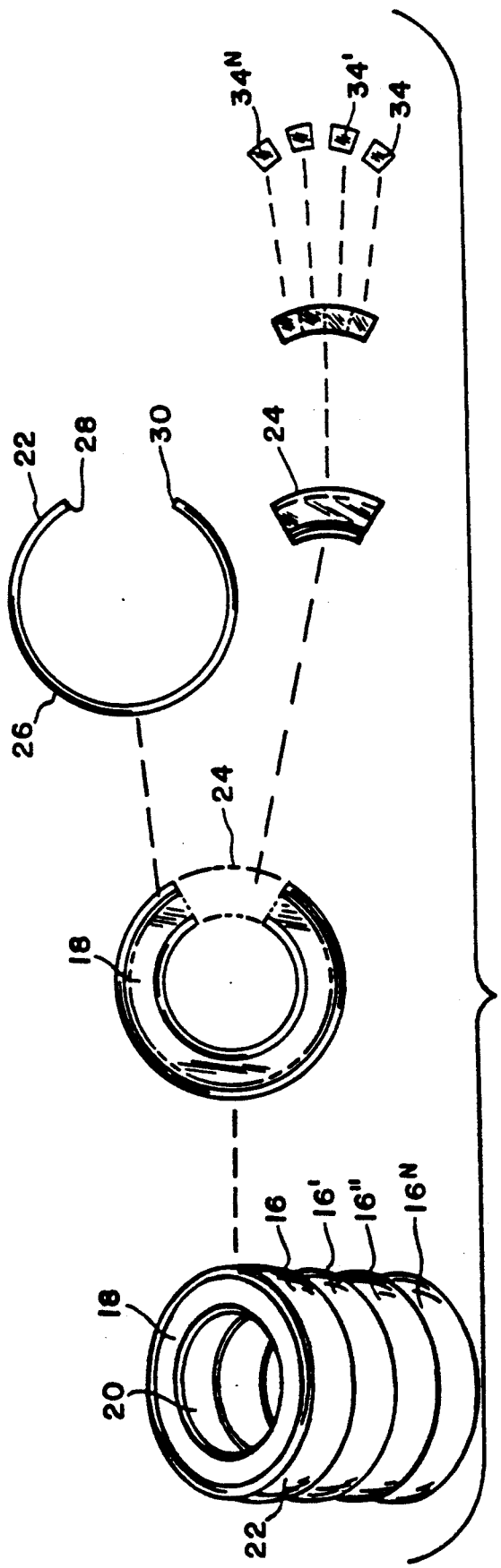

DRUM PROTECTOR

This invention relates to a method of manufacturing a protective member for a drum from a plurality of used tires. The protective member is made from the tread sections of the used tires which have been joined together to form a unitary structure. The unitary structure is placed around a drum and fastened to a floor to hold the drum in a stationary position.

When a customer purchases a new tire in the United States it is not uncommon for a dealer to charge for disposal of a used tire. Some used tires are ground into granules and recycled in a variety of products such as floor mats, road materials, building construction and even burned by power companies as fuel to generate electricity. In the United States, the environmental protection agency has issued regulations relating to the disposal of used tires in land fills and by burning and as a result, the supply of used tires that need to be disposed of are increasing in quantity each year.

Most tires are constructed of cured rubber which is reinforced with chords of nylon or steel belts. The tires are designed to withstand stresses and damage when subjected to an impact force or load. Even after the tread of a tire has been worn away the chords or belts and sidewalls still retain their ability to withstand a substantial impact.

Recently, the United States Department of Transportation issued regulations relating to the transportation of packages containing hazardous materials in a vehicle of commerce. These regulations provide that such packages must be secured to prevent relative movement within a vehicle under normal incidents of transportation. Trucking firms have complied with these regulations by using toe boards, brace boards, restraining straps, ropes, cargo nets and other freight to secure the packages within a vehicle. The effort to secure such packages has resulted in considerable time in loading and unloading a vehicle especially when only a few packages such as drums are included in a load of freight.

Through the present invention, I have developed a protective system for securing an individual drum to a floor while at the same time extending the useful like of a resource which may otherwise may be disposed of before its useful life has been completed. The protective system is made from used tires through the following method of manufacture. A first used tire is obtained from a source of supply and the sidewalls are removed therefrom leaving a first tread section which now has a cylindrical shape with a substantial uniform cross section. This first tread section is thereafter severed to create a first strip. A second used tire is obtained from the source of supply and the process repeated to obtain a corresponding second strip. The first and second strips are thereafter joined together to form a unitary structure. A plurality of rectangular pieces are cut from the sidewalls of the first and second used tires. The rectangular pieces are attached to the unitary structure to define a plurality of cleats. When the cleats are secured to a floor or deck with the unitary structure positioned around a drum, the drum is prevented from moving during normal incidents of transportation.

It is an object of this invention to provide a drum with a protective member made from used tires.

It is a further object of this invention to provide a method of manufacturing a protective member essentially made from the tread section used tires.

It is a still further object of this invention to provide a method of manufacturing a protective member from the tread section of used tires to extend the life of a resource that previously may have been considered to have already met its useful life.

It is another object of this invention to provide a protective member for retaining a drum on a surface during transportation from one location to another.

These advantages and objects should be apparent from reading this specification while viewing the drawings wherein:

BRIEF DESCRIPTION OF THE DRAWINGS

FIG. 1 illustrates the steps in a method of manufacture whereby the tread section of a used tire is cut into strips which are later joined together to form a unitary structure to form a protective system for a drum in a manner as contemplated by the present invention;

FIG. 2 is view wherein a plurality of strips which have been joined together to form the unitary structure;

FIG. 3 is a sectional view taken along line 3—3 of FIG. 2 wherein the strips have been joined by stapling;

FIG. 4 is a sectional view of a plurality of steps that have been joined together by an adhesive bond;

DESCRIPTION OF THE PREFERRED EMBODIMENTS

Figure 6:
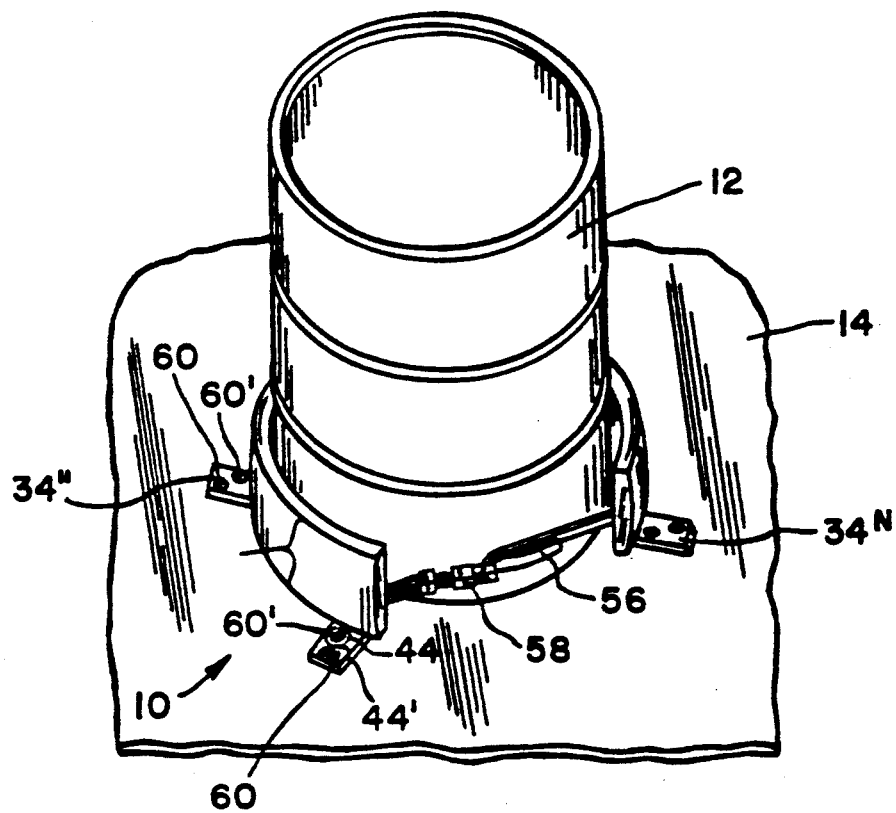
FIG. 6 is a view of the protective system wherein cleats have been attached to a floor to hold a drum in a stationary position.

The protective system 10 for securing a drum 12 to a surface, floor or deck 14 is best shown in FIG. 6. The protective system 10 is essentially made from used tires 16 which would otherwise be disposed of either by burning or shredded for other uses.

The protective system 10 is manufactured according to the following process as best illustrated in FIG. 1-5. A first tire 16 is obtained from a source of supply of used tires 16, 16 . . . $16_n$ and transported to a first station where the first 18 and second 20 sidewalls are removed leaving only a cylindrical tread section 22. A portion 24 of the cylindrical thread section 22 is removed to create a first strip 26 which has a substantially uniform cross-sectional thickness that extends from a first end 28 to a second end 30. This first strip 26 has rubber matrix which is reinforced by cords or belts 32, 32' . . . $32_n$ of steel or nylon, as illustrated in FIG. 3, according to the type of used tire selected from the source of supply. Under some circumstances, a single strip of pliable material may be sufficient to protect a drum 12 from damage, however for our protective system 10 multiple layers of strips 26, 26' have been deemed necessary for providing adequate protection under sever conditions such as when stored in a warehouse and protection is needed from impact loads such as when struck by the tines on a forklift truck.

Thereafter a second tire 16' is obtained from the source of supply and transported to the first station where the sidewalls and a portion 24' of the cylindrical thread section removed to create a second strip 26'.

In order to obtain a unitary structure 36 as shown in FIG. 2, the first 28, 28' and second 30, 30' ends of the first 26 and second 26' strips are aligned over each other and staples 38, 38 . . . $38_n$ applied at intervals along the edge of the thread sections 22, 22'. However, under some circumstances, a better bond may be obtained through the use of an adhesive layer 40, as illustrated in FIG. 4. The adhesive layer 40 would only have to be applied to one surface of the strips 26, 26' and could offer some additional resistance to impact loads.

Those portions 24 of the sidewalls 18 and 20 which are removed from the first and second tires 16, 16' are transported to a second station where a plurality of rectangular members 34, 34' . . . $34_n$ are obtained through either a stamping or cutting operation. Holes 42, 42'0 are cut in each of the rectangular members 34, 34' . . . $34_n$. Under some circumstances it may be desirable to reinforce the area around holes 42, 42' with a disc 44, 44'.

Figure 5:
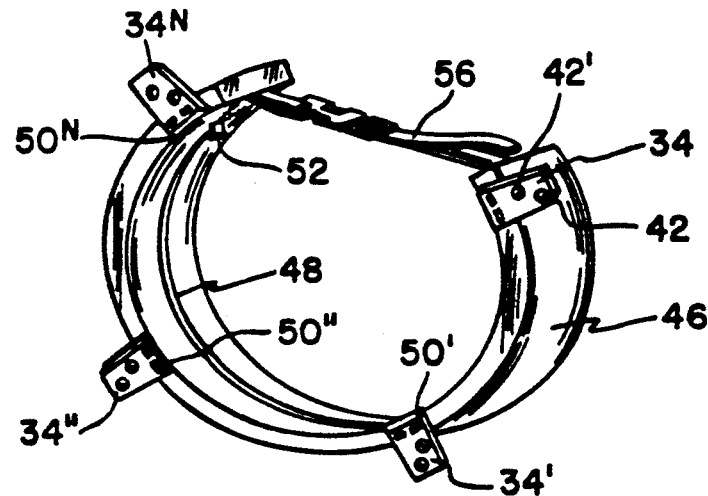
FIG. 5 is a perspective view of the unitary structure with a cover located around the unitary structure.

When the first 26 and second strips 26' are joined together to form unitary structure 36, a desired number of the rectangular members 34, 34' . . . $34_n$ are attached to one edge thereof to form cleat members, as shown in FIGS. 5 and 6.

The unitary structure 36 with the attached rectangular members 34, 34' . . . $34_n$ is placed around a drum 12 and fixed to a floor or deck 14 a drum from moving during transportation or to protect the drum from damage that could occur by an impact force when stored in a warehouse. In order to store and aid in positioning the unitary structure 36 around a drum 12, a unitary cover 46 is located around the unitary structure 36. The cover 46 which is made of a high density nylon material which has on opening 48 with a zipper 50 along an interior surface. After the rectangular members 34, 34' . . . $34_n$ are pushed through corresponding openings 50, 50' . . . $50_n$, zipper 52 is moved to enclose the unitary structure 36. A strap 56 which is attached to cover 46 has a buckle 58 which allows the overall circumference of the protection system 10 to be adjusted to the circumference of drum 12.

When a drum 12 is stored in a warehouse, the protection system 10 is located around the bottom of the drum 12 by the strap 56. The height "h" of the unitary structure 36 will be from 6–8 inches depending on the used tires selected from the source of supply. This height should offer sufficient protection from damage caused by any impact load that may occur if struck by a tine of a forklift. Later, when a drum 12 is loaded on a vehicle of transportation, the drum 12 must be secured to the floor or deck 14 of the vehicle to prevent movement. Nails 60, 60' which are located in openings 42, 42' in the rectangular members 34, 34' . . . $34_n$ are driven into the floor or deck 14 to secure the drum 12 during transportation.

I claim:

1. In combination a protective member and a drum, said protective member securing said drum to a deck of a vehicle, said combination comprising:

a first cylindrical strip of pliable material having a first end and a second end, said first strip having a uniform thickness with a plurality of reinforcing chords retained in a rubber matrix that extend from said first end to said second end;

a second cylindrical strip of pliable material having a first end and a second end, said second strip having a uniform thickness with a plurality of reinforcing chords retained in a rubber matrix that extend from said first end to said second end;

means joining said first strip to said second strip to form a unitary structure, said unitary structure being positioned around the drum; and a plurality of cleats secured to said unitary structure, said cleat being adapted to be fixed to the deck to hold the drum in a stationary position.

2. The combination as recited in claim 1 wherein said means joining said first strip to said second strip includes:

a plurality of staples that extend through said first and second strips to form said unitary structure.

3. The combination as recited in claim 1 wherein said means joining said first strip to said second strip includes:

an adhesive applied to at least one surface of said first and second strips, said adhesive holding said first and second strips in a desired alignment to form said unitary structure.

4. The combination as recited in claim 1 further including:

a cover that surrounds said unitary structure, said cover having a plurality of openings therein which allow said plurality of cleats to extend outside of said cover.

5. The combination as recited in claim 4 wherein said cover further includes:

an adjustable strap for positioning said unitary structure around said drum prior to the fixing of said cleats to the deck.

6. The combination as recited in claim 4 wherein said cover further includes:

a zipper which allows for ease in placing and removing said cover on said unitary structure.

7. A method of manufacturing a protective member for a drum from used tires comprising the steps of:

obtaining a first tire from a source of supply, said first tire having a first tread section with first and second sidewalls extending therefrom;

removing said first and second sidewalls from said first tread section to create a first cylindrical member;

cutting said first cylindrical member to obtain a first strip having a first end and a second end;

obtaining a second tire from a source of supply, said second tire having a second tread section with first and second sidewalls extending therefrom;

removing said first and second sidewalls from said second tread section to create a second cylindrical member;

cutting said second cylindrical member to obtain a second strip having a first end and a second end;

joining said first strip to said second strip to define a unitary structure;

cutting a plurality of substantially rectangular members from any of said sidewalls of either said first or second tires; and attaching said plurality of rectangular members to said unitary structure to form cleats, said cleats being attached to a floor to position said unitary structure around a drum and hold said drum in a stationary position.

8. A method of manufacturing a protective member for a drum from used tires as recited in claim 7 wherein said step of joining includes:

applying an adhesive material to at least one of said first and second strips to hold said unitary structure together.

9. A method of manufacturing a protective member for a drum from used tires as recited in claim 7 wherein said step of joining includes:

stapling said first and second strips together to hold said unitary structure together.

10. A method of manufacturing a protective member for a drum from used tires as recited in claim 7 further including the step of:

placing a cover around said unitary structure.

11. A method of manufacturing a protective member for a drum from used tires as recited in claim 10 further including the step of:

attaching a strap to said cover, said strap being adjustable such that said unitary structure can be positioned around various size drums.

12. A method of manufacturing a protective member for a drum from used tires as recited in claim 11 further including the step of:

placing a zipper in said cover to facilitate ease in the placement on said unitary structure.

13. A protective member for a drum, said protective member comprising:

a first cylindrical strip of pliable material having a first end and a second end, said first strip having a thickness with a plurality of reinforcing chords retained in a rubber matrix that extend from said first end to said second end;

a second cylindrical strip of pliable material having a first end and a second end, said second strip having a thickness with a plurality of reinforcing chords retained in a rubber matrix that extend from said first end to said second end;

means joining said first strip coextensively to said second strip whereby said first strip is located on top of said second strip to form a unitary structure; and fastener means for securing said unitary structure around the drum, said unitary structure absorbing any impact forces directed at the drum.

14. The protective member as recited in claim 13 wherein said means joining said first strip to said second strip includes:

a plurality of staples that extend through said first and second strips to form said unitary structure.

15. The protective member as recited in claim 13 wherein said means joining said first strip to said second strip includes:

an adhesive applied to at least one surface of said first and second strips, said adhesive holding said first and second strips in a desired alignment to form said unitary structure.

16. The protective member as recited in claim 13 further including:

a plurality of cleats secured to said unitary structure, said cleats being adapted to be fixed to a floor to hold the drum in a stationary position.

17. The protective member as recited in claim 13 wherein said fastener means includes:

a cover that surrounds said unitary structure, said cover having a first strap adjustably joined to a second strap to hold said unitary structure in a fixed position on the drum.

18. The protective member as recited in claim 13 wherein said fastener means includes:

a first strap attached to said first end of said first strip;

a second strap attached to said second end of said first strip; and buckle means for attaching said first strap to said second strap to secure said unitary structure to the drum.

* * * * *